United States Patent [19]

Peters

[11] 4,389,135

[45] Jun. 21, 1983

[54] RELEASABLE LOCKING DEVICE

[76] Inventor: Jack Peters, 5 Pinehurst, Wildwood Estates, Prescott, Ariz. 86301

[21] Appl. No.: 278,927

[22] Filed: Jun. 30, 1981

[51] Int. Cl.³ .................. B25G 3/18; F16B 21/00; F16D 1/00

[52] U.S. Cl. .................................. 403/327; 403/316; 403/379; 403/163; 403/49; 292/177

[58] Field of Search .............. 403/327, 324, 325, 326, 403/316, 317, 163, 388, 379; 292/256, 275, 177; 403/49

[56] References Cited

U.S. PATENT DOCUMENTS

| | | | |
|---|---|---|---|
| 1,298,861 | 4/1919 | Babbitt | 292/177 |
| 1,702,506 | 2/1929 | Hennicke | 292/256 |
| 4,050,327 | 9/1977 | Thomas et al. | 403/316 |
| 4,105,347 | 8/1978 | Gossage | 403/327 |
| 4,289,416 | 9/1981 | Birr et al. | 403/163 |

FOREIGN PATENT DOCUMENTS 748064  7/1980  U.S.S.R. .......................... 403/324

Primary Examiner—Wayne L. Shedd
Attorney, Agent, or Firm—Pollock, Vande Sande & Priddy

[57] ABSTRACT

A releasable locking device for pivotally locking two members to one another. The locking device includes a hollow support assembly extending through an opening in one of the members. A locking member extends through a bore in the hollow support assembly and is formed with an enlarged locking portion insertable through an interior portion of an opening formed in the remaining member. The locking member includes a conically-shaped guidance surface for automatically aligning the enlarged locking portion with the interior opening in response to a biasing spring acting on the locking member.

12 Claims, 7 Drawing Figures

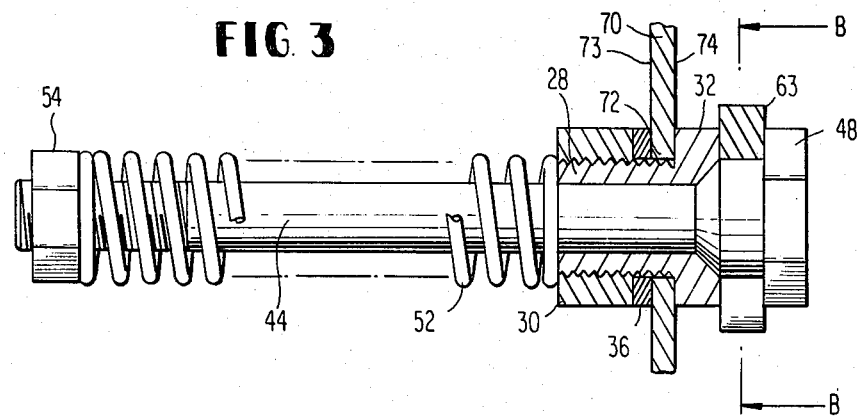
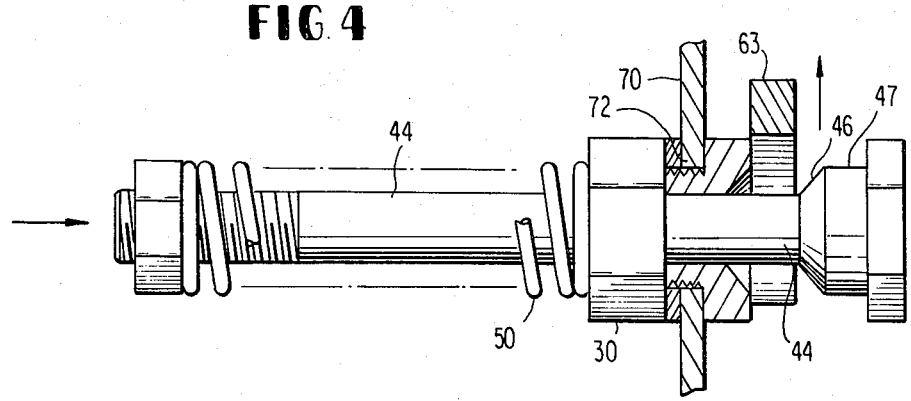
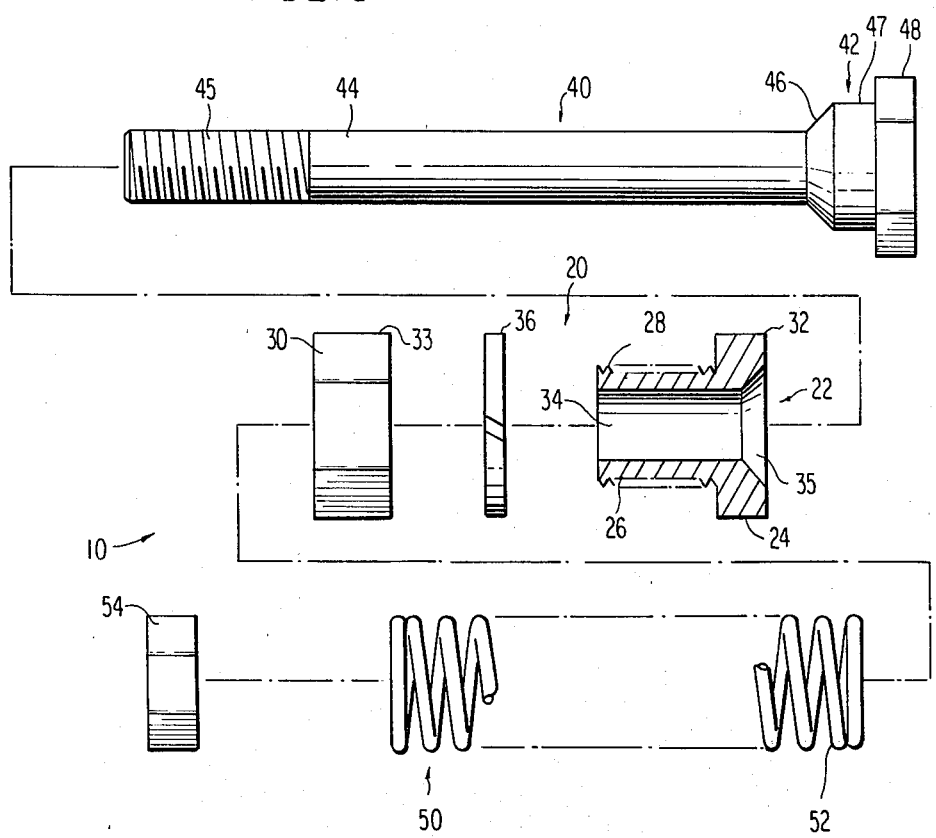

RELEASABLE LOCKING DEVICE

FIELD OF INVENTION

The present invention relates to a releasable locking device and, in particular, to an extremely compact, self-contained locking device for releasably locking two members to one another.

BACKGROUND ART

Releasable locking devices come in a variety of shapes and sizes. However, many such locking devices have proven less than satisfactory for a number of reasons. The relatively complex design of many locking devices tend to significantly increase the manufacturing and, or installation cost of such devices. Furthermore, the complexity of the locking mechanisms in such devices can lead to jamming of the components after repeated use. Certain locking devices also suffer from a general inability to compensate for slight misalignments which can routinely occur between the members to be locked.

Typical of such locking devices is the device suggested in U.S. Pat. No. 2,670,932 issued to Westerfors, wherein an elaborate support bracket is employed to mount the locking mechanism on one of the members to be locked. The support bracket adds to the size and cost of the locking device without improving the operation of the device. In Westerfors, precise alignment of the moveable lever relative to the fixed member must be achieved before the locking bolt can move to its locked position. Because the moveable lever must bottom out against the support bracket to achieve such proper alignment, it becomes impossible to pivot the moveable lever once in its locked position.

A further approach is suggested in U.S. Pat. No. 2,745,692 issued to Persson which suggests a locking device mounted directly in a movable handle. Even though the Persson device eliminates the extensive support bracket of Westerfors, Persson fails to provide a self-contained locking device. In particular, the biasing spring employed to project the locking bolt into position is compressed against a step-shaped bore formed in the handle. In order to generate the step-shaped bore, at least two boring steps are required, thereby increasing the manufacturing costs of the device. More importantly, Persson fails to provide any assembly for guiding introduction of the locking bolt into the opening formed in the lever member. As a result, any misalignment between the handle and lever members makes it difficult, if not impossible, to insert the locking bolt through the members as required during the locking operation.

As will become evident from the following description, the present invention provides a compact, completely self-contained locking device capable of releasably locking a movable member to a relatively stationary member even when the movable lever is slightly misaligned relative to the locking mechanism.

DISCLOSURE OF THE INVENTION

The releasable locking device of the present invention includes a number of advantages not believed to be present in known locking devices. The compact design of the present invention eliminates the need for any support bracket of the type required in Westerfors. Because the locking assembly of the present invention is a completely self-contained unit, the elaborate step-shaped bore required in Perssons is also eliminated. Rather, a single diameter bore through one of the members is sufficient for mounting the locking mechanism as will be described in detail hereafter. A significant advantage of the present invention resides in a beveled guidance surface for smoothly guiding the locking bolt into an opening in one of the members, even when the opening is initially misaligned relative to the locking bolt. As a result, the need for perfect alignment of the members is eliminated. Furthermore, the uniquely designed locking device of the present invention allows for relative pivoting movement of members even after the locking bolt is in place. This feature can prove significantly helpful if it becomes necessary to adjust the positions of the members while retaining the members locked to one another.

The locking device of the present invention can be employed in countless situations. One use for which the locking device is particularly well suited is with a stepladder which may be converted into a straight ladder of increased length. Such a stepladder is discussed in applicant's existing U.S. Pat. No. 4,157,128 issued June 5, 1979, for which it is repectfully requested that the subject matter be incorporated into the present application by express reference thereto. The stepladder includes a pair of pivotally attached leg members interconnected by a cross-support assembly which engages each of the leg members. The cross-support assembly may comprise a single lever or a pair of levers pivotally attached end-to-end.

The present invention provides a locking device for releasably locking the cross-support assembly to either or both of the leg members of the stepladder. The locking device includes a specially designed support assembly extending through an opening formed in the leg member. Preferably, the support assembly takes the form of a hollow, specially designed support bolt including threads formed on an exterior end portion and an enlarged head formed on an end portion oppositely disposed from the threaded end. A bore extends completely through the support bolt and includes a conically-shaped end portion located within the enlarged head portion. The conically-shaped opening uniformly increases in diameter as the distance from threaded end portion increases. A clamping nut threadedly mounted on the hollow support bolt serves to press the pivot leg against the enlarged head portion, thereby clamping the support bolt in place on the leg member.

The locking device also includes a locking member having an elongated, substantially cylindrically-shaped stud portion adaptable for insertion completely through the bore formed within the hollow support bolt. The locking member includes an enlarged portion having a conically-shaped surface extending outwardly from the stud portion. The conically-shaped surface joins a cylindrically-shaped collar portion which, in turn, joins a hexagonally-shaped end portion. It is important to note that the conically-shaped surface formed in the hollow support bolt is similar in size and shape to the conically-shaped surface formed in the locking member. A resilient biasing assembly is compressed between a stop nut mounted on the elongated end portion of the locking member and the clamping nut, whereby the resilient biasing assembly functions to draw the beveled face of the locking member into surface contact with the conically-shaped portion of the support bolt.

A movable member to be secured by the locking device includes an enlarged opening having a neck-shaped inlet extending to a side of the movable member. The enlarged opening has a diameter slightly larger than the diameter of the cylindrically-shaped collar portion of the locking member. In comparison, the neck-shaped inlet defines a somewhat smaller opening or gap slightly greater than the diameter of the cylindrically-shaped stud portion and yet significantly smaller than the diameter of the collar portion, thereby preventing the enlarged end portion of the locking member from passing through the neck-shaped inlet.

To assemble the locking device, the threaded support bolt is inserted through the opening in the leg member of the stepladder until the enlarged end portion abuts a side of the leg member. A conventional split lock washer and the clamping nut are then mounted on the threaded end of the support bolt and advanced until the clamping nut presses the lock washer into contact with the leg member. The locking member is then inserted completely through the bore formed in the support bolt until the conically-shaped face of the support bolt makes surface contact with the conically-shaped surface of the locking member. The resilient biasing assembly, preferably a compression spring, is then mounted on the elongated stud portion of the locking member. Finally, a stop or lock nut is threaded onto the elongated stud portion in order to compress the spring against the clamping nut. This completes assembly of the locking device.

To lock a cross-support lever member to the leg member, pressure is applied to the lock nut. This functions to project the locking member back through the hollow support bolt until a portion of the elongated stud is exposed on an opposite side of support bolt from the locking nut. At this time, the cross-support lever member is moved toward the locking member until the neck-shaped inlet intersects the newly exposed stud portion of the locking member. Further, movement of the lever member serves to position the locking member within the enlarged opening extending through the lever member. At this time, pressure on the lock nut is relieved, allowing the compression spring to expand.

The compression spring projects the locking member through the support bolt as well as through the opening formed in the movable lever member. The uniquely-shaped conical surface portion of the locking member serves to align the lever opening with a longitudinal axis through the locking member. As a result, the cylindrically-shaped collar portion of the locking member can be drawn into the lever opening. Because the collar has a diameter appreciably larger than the gap formed by the neck-shaped inlet, the collar prevents the lever from separating from the locking member. Furthermore, the collar is arranged to extend through the lever opening when the conically-shaped surface on the locking member comes to rest against the conically-shaped surface on the support bolt. A conventionally-shaped hex head is formed on the enlarged end portion of the locking member to limit movement of the lever member directly away from the leg member. The movable lever member is pivotally mounted on the enlarged end of the locking member, thereby retaining full pivoting freedom, allowing the ladder to be folded as required for storage or expanded for stepladder use without unlocking the cross-support lever member from the leg member.

The present invention is in no way intended to be limited to use only with stepladders. Rather, the locking device can be employed almost anywhere it is desirable to lock two members to one another. For example, the locking device can be employed as a sash lock or even a lock for playpens. Likewise, the locking mechanism may be mounted on a movable member which is brought into engagement with an appropriately shaped opening formed in a stationary member.

BRIEF DESCRIPTION OF THE DRAWINGS

Other important objects and advantages of the invention will be apparent from the following description and the accompanying drawings in which:

FIG. 1 shows an exploded view of a releasable locking device formed in accordance with a preferred embodiment of the present invention;

FIG. 3 shows a partially sectioned side view of the locking device in the locked position as taken along the plane A—A in FIG. 2;

FIG. 4 shows a partially sectioned side view of the locking device of FIG. 3 in a semi-locked position;

BEST MODE FOR CARRYING OUT THE INVENTION

Figure 2:
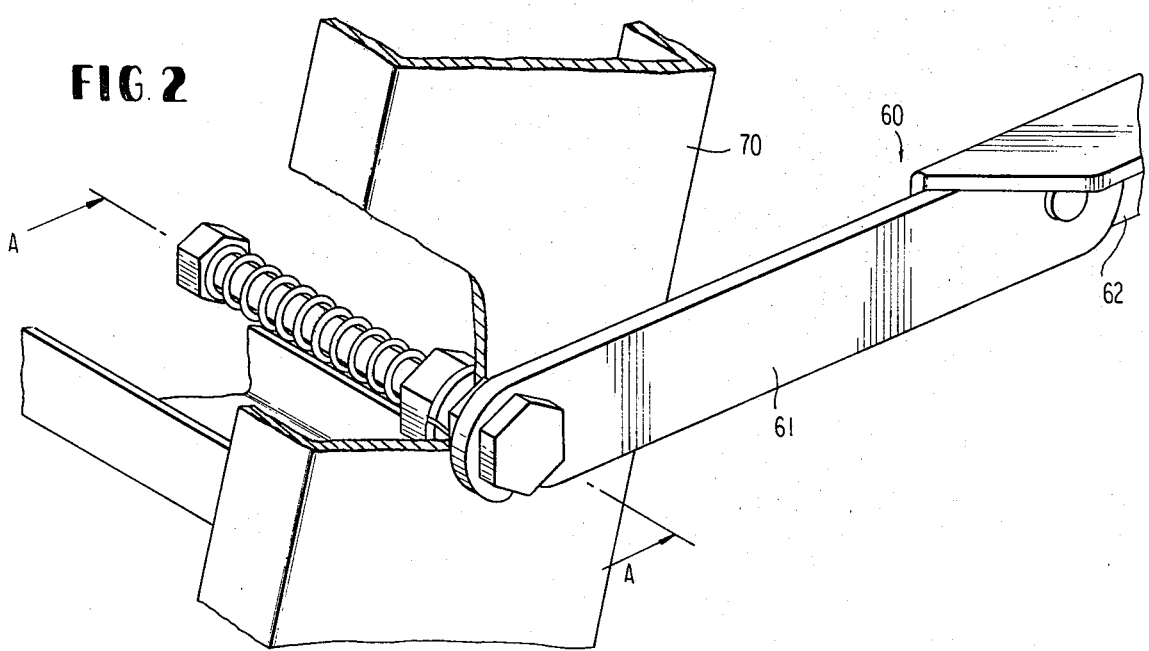
FIG. 2 shows a perspective view of the locking device of FIG. 1 mounted on a stepladder leg and secured to a movable cross-support lever.

A preferred embodiment of the invention is illustrated in FIGS. 1-6 of the drawings. As seen best in FIG. 1, a compact, completely self-contained locking device formed in accordance with a preferred embodiment of the present invention is generally indicated by numeral 10. Locking device 10 includes a hollow support assembly 20, a locking member 40 and a resilient biasing assembly 50.

Hollow support assembly 20 preferably includes a specially designed hollow support bolt 22 having an enlarged head portion 24 and a elongated, substantially cylindrically-shaped end portion 26 extending therefrom. Conventional threads 28 are formed in an outer surface of end portion 26 to allow for attachment of a conventional threaded clamping nut 30 thereon. Support bolt 22 and clamping nut 30 are each preferably of 7/16 inch size, however, it is considered within the scope of the present invention to employ a support bolt and clamping nut of any conventional size.

As best shown in FIG. 1, enlarged head portion 24 includes a hexagonally-shaped outer surface 32 to allow support bolt 22 to be conveniently gripped by a socket wrench during assembly. In a like manner, clamping nut 30 also preferably includes a hexagonally-shaped outer surface 33 for easy engagement with a conventional socket wrench or the like. The hexagonally-shaped surfaces of the support bolt and clamping nut are merely convenient design choices, and it is considered within the scope of the present invention to substitute any conventional shape therefore.

Support bolt 22 further includes a centrally disposed bore 34 extending through bolt 22 in a direction parallel to a longitudinal axis of bolt 22. The wall forming bore 34 includes a conically-shaped end portion 35 disposed within enlarged head portion 24. Conically-shaped end portion 35 uniformly increases in diameter as the distance from end portion 26 increases until reaching a maximum diameter at the end surface which is substantially equal to a maximum diameter of threaded end portion 26. Besides including support bolt 22 and clamping nut 30, support assembly 20 also includes a split lock washer 36 preferably mounted on threaded end portion 26 between clamping nut 30 and enlarged head portion 24.

As noted here before, locking device 10 also includes a locking member 40. Locking member 40 includes an enlarged portion 42 and an elongated stud portion extending therefrom. Stud portion 44 has a substantially cylindrically-shaped configuration and includes a threaded end portion 45 remotely positioned from enlarged end portion 42. Stud portion 44 has an axial length which is appreciably greater than an axial length of hollow bolt 22. Stud portion 44 also has an outer diameter slightly less than a diameter of bore 34 extending through bolt 22. Enlarged portion 42 includes a conically-shaped surface 46 extending outwardly from stud portion 44. A cylindrically-shaped collar portion 47 extends between conical surface 46 and a hexagonally-shaped end portion 48 having a diameter greater than a diameter of collar 47. Conically-shaped surface 46 is preferably similar in shape and size to the conicallys-shaped end wall 35 formed within enlarged head portion 24.

Referring again to FIG. 1, resilient biasing assembly 50 is shown to include an elongated, helically-shaped compression spring 52 and a hexagonal lock nut 54. Lock nut 54 includes a threaded bore, not shown, which is complimentary in size and shape to the threaded end portion 45 of locking member 40.

The present invention is ideally suited for releasably locking a movable member to a stationary member. Preferably, locking device 10 is employed to releasably secure a cross-support assembly 60 to a pair of stepladder leg members, with only leg member 70 shown in FIG. 2. Cross-support assembly 60 may consist of one or a plurality of pivotally attached levers, such as levers 61 and 62, respectively. Lever 61 includes an end portion 63 formed with an enlarged opening 64 extending completely therethrough. Opening 64 is preferably centered within end portion 63 and has a diameter D which is slightly larger than the diameter of collar 47. End portion 63 further includes a neck-shaped inlet 65 extending between a side 66 of lever 61 and opening 64. Neck-shaped inlet 65 has a minimum width W which is slightly greater than the diameter of stud portion 44 and, at the same time, appreciably less than the diameter D of opening 64. While neck-shaped inlet 65 is shown as extending between opening 64 and a vertically bottom side 66 of lever 61, it is equally permissible for inlet 65 to extend between opening 64 and a vertically upper side 67 or lever 61.

To assemble locking device 10, it is merely necessary to insert the cylindrically-shaped end portion 26 of support bolt 22 through an opening 72 in leg member 70. The diameter of opening 72 is sufficiently large to allow passage of end portion 26, and yet small enough to block enlarged head portion 24 from passing therethrough. Lock washer 36 and clamping nut 30 are mounted on end portion 26 and advanced until washer 36 buts a side wall 73 of leg member 70 and nut 30 buts washer 36. Additional rotation of nut 30 serves to draw enlarged head portion 24 into tight contact with a further, opposite side 74 of leg member 70. At this point, support assembly 20 is tightly clasped into engagement with leg member 70.

The elongated stud portion 44 of locking member 40 is then inserted through bore 34 until the conically-shaped surface 46 on locking member 40 contacts the conically-shaped end portion 35 of locking bolt 22. At this point, elongated stud portion 44 extends beyond locking bolt 22 by an appreciable distance. Helical compression spring 52 is then mounted on stud portion 44, with an end of spring 52 contacting nut 30. Finally, lock nut 54 is threaded on to stud portion in order to initially compress spring 52 between lock nut 54 and clamping nut 30. Compressed spring 52 applies a force against lock nut 54 which serves to draw conical surface 46 into tight surface contact with conical end portion 35. Locking device 10 is now assembled for use.

Figure 6:
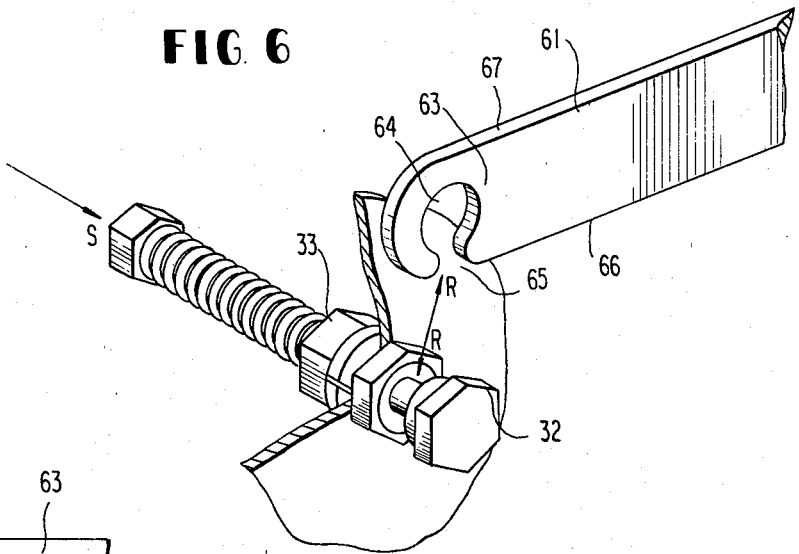
FIG. 6 shows a perspective view of the present invention in the completely unlocked position.
Figure 5:
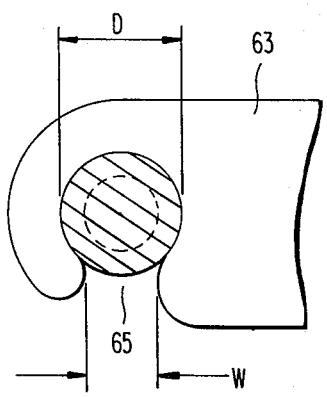
FIG. 5 shows an end view of the locking device taken along the plane B—B in FIG. 3.

To releasably lock cross-support lever assembly 60 to leg member 70, lever 61 is moved toward locking device 10 as shown by the arrows R—R in FIG. 6. Lock nut 54 is then depressed in the direction of arrow S in order to separate enlarged end portion 42 of locking member 40 from the enlarged head portion 24 of support bolt 22. Such movement of locking member 40 in the direction of arrow S also serves to separate the two conically-shaped surfaces from one another. After locking member 40 has moved an appreciable distance as described hereabove, lever 61 is again moved toward locking device 10, causing stud portion 44 to pass through neck-shaped inlet 65 and enter opening 64 as shown in FIG. 4. Pressure is then removed from locking member 40, allowing spring 52 to draw locking member 40 through locking bolt 22 to its original position as shown in FIG. 3.

It is important to understand that conical surface 46 acts to automatically align lever opening 64 with support member 40 by smoothly guiding collar portion 47 into the opening 64. Conically-shaped surface 46 effectively counteracts any misalignment which may occur between lever 61 and locking member 40 by guiding the lever into a position wherein the longitudinal axis of portion 47 is aligned with the center of opening 64.

When locking device 10 achieves the fully locked position shown in FIG. 3, collar 47 is aligned with neck-shaped inlet 65, preventing withdrawal of locking member 40 through inlet 67. Furthermore, because the hexagonally-shaped end portion 48 of locking member 40 and the hexagonally-shaped outer surface 32 of support bolt 24 are disposed on opposite sides of lever 61, they prevent lever 61 from moving laterally toward or away from leg member 70. While locking member 40 and support bolt 22 effectively lock lever 61 against lateral and longitudinal movement, lever 61 is left to freely pivot about collar 47. This, in turn, makes it possible to collapse the stepladder into its folded position or expand the stepladder without releasing lever 61 from leg member 70.

The fully-locked position of locking member 40 is achieved when the similarly-shaped conical surfaces 35 and 46 achieve surface-to-surface contact with one another. The normal frictional forces acting between the conical surfaces tend to prevent locking member 40 from rotation relative to support bolt 22. This, in turn, helps to maintain lever 61 in a predetermined orientation on locking member 40 until an external pivoting force is applied to the lever as would occur when folding or extending the stepladder.

Figure 7:
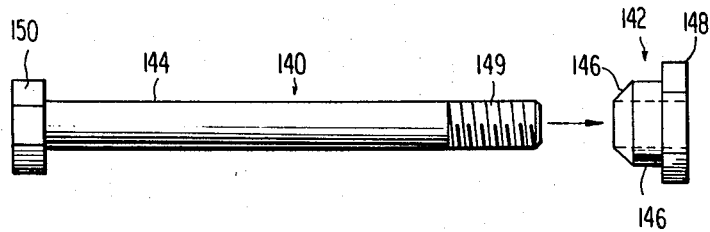
FIG. 7 shows a side view of a locking member formed in accordance with an alternative embodiment of the present invention.

While a one-piece locking member 40 is considered preferable, it is within the scope of the present invention to form a two-piece locking member 140 as shown in FIG. 7. Locking member 140 includes an enlarged, hollow end portion 142 and a separate threaded bolt 144. Enlarged end portion 142 is similar to end portion 42 and includes a conical portion 146, a cylindrically-shaped collar portion 147 and a hexagonal end portion 148 integrally joined thereto. However, enlarged end portion 142 also includes internal threads, not shown, adaptable for engaging external threads 149 formed on bolt 144. In the embodiment of FIG. 7, bolt 144 includes a hexagonal head portion 150, eliminating the need for a separate lock nut.

The present invention effectively locks a movable lever member to a relatively stationary leg member, while allowing full pivoting freedom between the two members. The invention is in no way limited to use with stepladders, rather, the invention is believed to provide a compact, releasable locking device which can be used to lock almost any two relatively movable members to one another.

The present invention is not intended to be limited to the embodiments described hereabove, but only by the scope of the claims following hereafter.

What is claimed is:

1. A releasable self-contained locking device for pivotally locking first and second members, and comprising:
   a hollow support assembly extending through an opening formed in a first of said members, said hollow support assembly including an enlarged head portion disposed on a first side of said first member with an internal bore extending completely through said hollow support assembly;
   a locking member including a stud and an enlarged locking portion, said stud extending completely through said internal bore and said enlarged locking portion adjacently disposed to said enlarged head portion of said hollow support assembly;
   said second member including an opening having an inlet portion extending inwardly from an edge of said second member adjoining an interior portion of enlarged diameter, said inlet defining a gap sufficiently large to allow passage of said stud portion therethrough and sufficiently small to block passage of said enlarged locking portion and said interior portion defining an opening sufficiently large to enclose said enlarged locking portion;
   resilient biasing means abutting said locking member and said support assembly for biasing said locking member through said interior portion of said opening and into said internal bore; and
   guidance means for automatically aligning said interior portion of said opening with enlarged head portion, allowing said enlarged head portion to extend through said opening and lock said to second member into pivoted engagement with said first member.

2. A releasable locking device according to claim 1, wherein said hollow support assembly comprises a hollow bolt having a cylindrically-shaped end portion extending from said enlarged head portion through said opening formed in said first member.

3. A releasable locking device according to claim 2, wherein said cylindrically-shaped end portion includes a plurality of external threads formed on an outer surface portion disposed on the second side of said first member.

4. A releasable locking device according to claim 3, when said hollow support assembly further comprises a clamping nut rotably disposed on said external threads.

5. A releasable locking device according to claim 4, wherein said hollow support assembly further comprises a split lock washer mounted on said threaded end portion of said hollow bolt in compressed relationship between said clamping nut and the second side of said first member;
   said enlarged head portion abutting the first side of said first member to fixedly secure said hollow support assembly to said member.

6. A releasable locking device according to claim 1, wherein said stud extends an appreciable distance beyond an end of said bore located on the second side of said first member and includes a stop member extending outwardly from a portion of said stud remotely spaced from said hollow support assembly;

7. A releasable locking device according to claim 6, wherein said resilient biasing means comprises a compression spring mounted on said stud portion and compressed between said stop member and said hollow support assembly.

8. A releasable locking device according to claim 6, wherein said stop member is rotatably mounted on said stud and said enlarged locking portion is integrally attached to said stud.

9. A releasable locking device according to claim 6, wherein said stop member is integrally attached to said stud and said enlarged locking portion is removably mounted on said stud.

10. A releasable locking device according to claim 1, wherein said guidance means comprises a conically-shaped surface extending outwardly from said stud into engagement with a cylindrically-shaped collar portion of said enlarged locking portion.

11. A releasable locking device according to claim 10, wherein said enlarged locking portion includes an end having a diameter greater than a diameter of said collar portion to prevent said second member from moving outwardly from said first member when said collar portion is disposed within the interior portion of said opening extending through said second member.

12. A releasable locking device according to claim 10, wherein a portion of the interior bore facing said conically-shaped surface is formed with a beveled surface similar in shape and size to said conically-shaped surface,
   whereby said resilient biasing means biases said conically-shaped surface into contact with said beveled surface to limit movement of said locking member through said hollow support assembly.

* * * * *